United States Patent [19]
Fukuda

[11] Patent Number: 5,202,801
[45] Date of Patent: Apr. 13, 1993

[54] INTEGRATED CIRCUIT FOR PRODUCING SENSOR DETECTION SIGNALS IN A RECORDING/REPRODUCING APPARATUS

[75] Inventor: Shinichi Fukuda, Kanagawa, Japan

[73] Assignee: Sony Corporation, Tokyo, Japan

[21] Appl. No.: 586,203

[22] Filed: Sep. 21, 1990

[30] Foreign Application Priority Data

Nov. 15, 1989 [JP] Japan .................................. 1-296474

[51] Int. Cl.$^5$ ........................ G11B 21/04; G11B 15/46
[52] U.S. Cl. ........................................ 360/70; 360/69; 360/73.04
[58] Field of Search .................... 360/69, 70, 73.04; 307/350, 363, 268, 475

[56] References Cited

U.S. PATENT DOCUMENTS

| | | | |
|---|---|---|---|
| 3,851,189 | 11/1974 | Moyer | 307/279 |
| 3,889,290 | 6/1975 | Seaton | 360/12 |
| 4,104,684 | 8/1978 | Wakami et al. | 360/70 |
| 4,375,037 | 2/1983 | Ikushima | 307/268 |
| 4,930,031 | 5/1990 | Nagahara et al. | 360/72.2 |

OTHER PUBLICATIONS

Microcomputer Hardware Handbook, 1982, p. 13.
Microelectronics by Jacob Millman 1979, sections 17.3–17.4.
"The Art of Electronics" by Paul Horowitz et al., 2nd Edition, 1989, pp. 457 and 458.

*Primary Examiner*—Andrew L. Sniezek
*Assistant Examiner*—Varsha V. Sheladia
*Attorney, Agent, or Firm*—Hill, Steadman & Simpson

[57] ABSTRACT

An integrated circuit includes a drum phase detection signal generating unit formed by two-stage amplifiers and a comparator, a drum frequency detection signal generating unit similarly formed by two-stage amplifiers and a comparator, a capstan frequency detection signal generating unit, and a supply reel frequency detection signal generating unit and a take-up reel frequency detection signal generating unit each formed by a comparator. From each associated voltage source a predetermined voltage is applied to each of the first stage amplifiers, second stage amplifiers, and to the comparators of the drum phase detection signal generating unit, drum frequency detection signal generating unit, capstan frequency detection signal generating unit, supply reel frequency detection signal generating unit, and the take-up reel frequency detection signal generating unit. In this manner, the drum phase detection signal generating unit, drum frequency detection signal generating unit, capstan frequency detection signal generating unit, supply reel frequency detection signal generating unit, and the take-up reel frequency detection signal generating unit may be formed on one and the same integrated circuit and can be operated in stable fashion.

4 Claims, 1 Drawing Sheet

ROTARY HEAD TYPE DAT

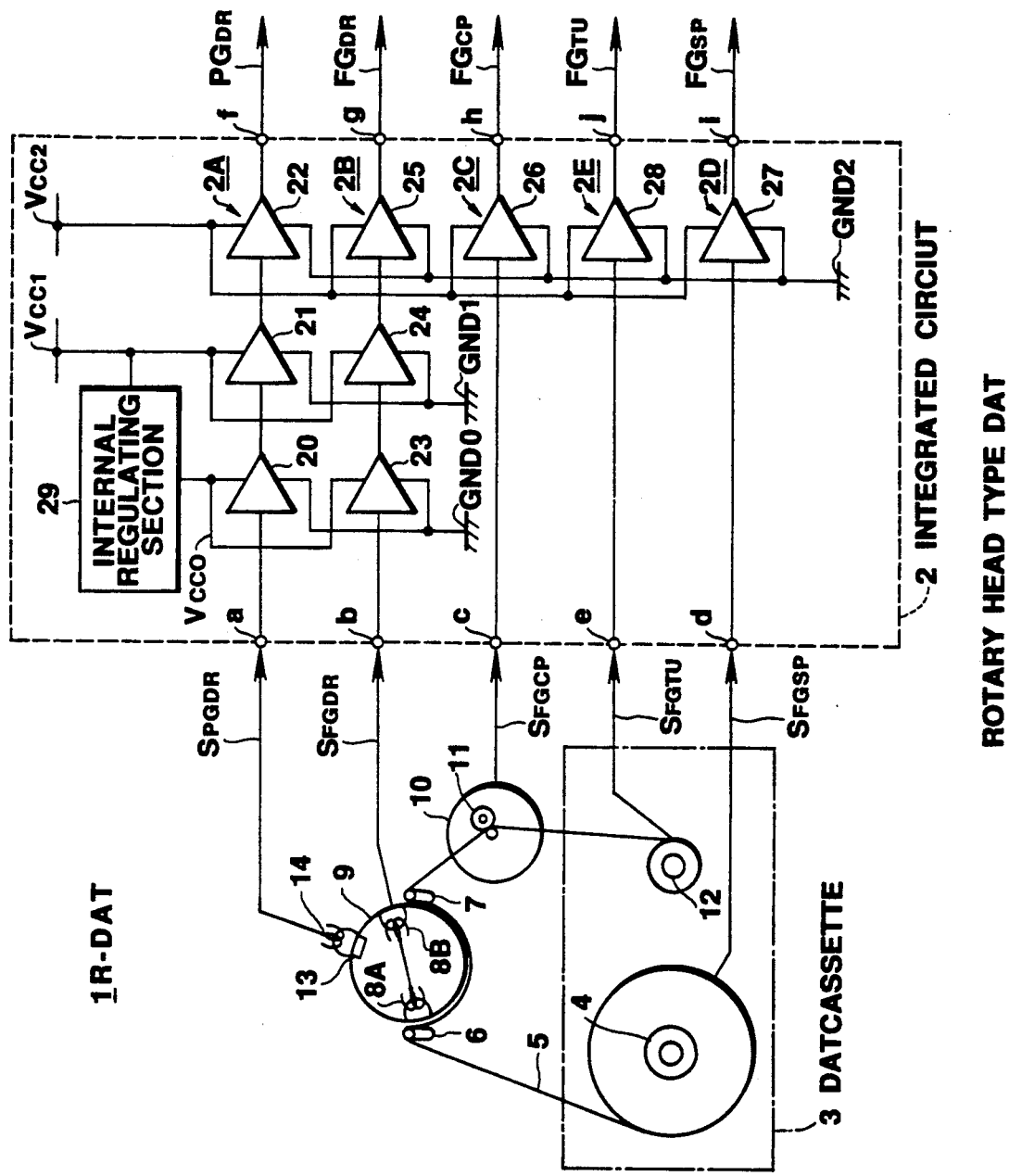

INTEGRATED CIRCUIT FOR PRODUCING SENSOR DETECTION SIGNALS IN A RECORDING/REPRODUCING APPARATUS

BACKGROUND OF THE INVENTION

This invention relates to an integrated circuit and may be advantageously applied to, for example, a rotary head digital audio tape recorder adapted for generating various sensor detection signals.

Conventionally, in a rotary head digital audio tape recorder (R-DAT), audio data is adapted to be recorded and/or reproduced on or from a magnetic tape wound on a rotary head. In the R-DAT, the recording/reproducing timing of the rotary head, the relative speed between the rotary head and the magnetic tape, and rotary head tracking or the tape running speed, are controlled with the aid of sensor output signals obtained from a variety of sensors provided in a drum driving the rotary head into rotational movement, and from a capstan and supply and take-up reels for the magnetic tape.

More specifically, the drum for driving the rotary head into a rotational movement includes a drum phase sensor formed by small magnetic pieces secured to the outer peripheral part of the drum, a magnetic head for detecting the passage of the small magnet pieces, and a drum frequency sensor in the frequency generator configuration. The drum phase signal and the drum frequency signal, obtained as output signals from the associated sensors, are transmitted to the downstream side drum phase detection signal generating circuit and drum frequency detection signal generating circuit, respectively.

The capstan and the magnetic tape supply and take-up reels are provided with a capstan frequency sensor, a supply reel frequency sensor, and a take-up frequency sensor, each in a frequency generator configuration respectively. The capstan frequency signal, supply reel frequency signal, and the take-up reel frequency signal, obtained as the output signals from these sensors, are transmitted to a capstan frequency detection signal generating circuit, a supply reel frequency detection signal generating circuit, and a take-up reel frequency detection signal generating circuit on the downstream side, respectively.

Meanwhile, the drum phase detection signal generating circuit, drum frequency detection signal generating circuit, capstan frequency detection signal generating circuit, supply reel frequency detection signal generating circuit, and the take-up reel frequency detection signal generating circuit are designed and constructed so that the input sensor output signals are amplified and converted into binary signals with a predetermined threshold level as the boundary; and the produced drum phase detection and drum frequency detection signals, capstan frequency detection signal, supply reel frequency detection signal, and the take-up reel frequency detection signal are transmitted to a drum servo circuit, capstan servo circuit, and supply and take-up reel motor control circuits, respectively.

In the above described R-DAT, it may be contemplated that if the five sensor detection signal generating circuits, that is the drum phase detection signal generating circuit, drum frequency detection signal generating circuit, capstan frequency detection signal generating circuit, supply reel frequency detection signal generating circuit, and the take-up reel frequency detection signal generating circuit could be formed on one integrated circuit, the circuit configuration may be simplified so that the R-DAT as a whole may be further reduced in size.

However, in practice with the drum phase detection signal signal generating circuit and the drum frequency detection signal generating circuit, the input frequencies are low and on the order of tens to hundreds of kilohertz, whereas the input signals are of small amplitudes on the order of tens to several microvolts and hundreds to several microvolts, respectively. Thus, an amplifier of an extremely high gain is necessitated for outputting the detection signals in the form of 0 to 5 V digital signals.

On the other hand, the capstan frequency detection signal generating circuit generates a signal of a large amplitude with an input level of several to tens of millivolts, whereas the supply reel frequency detection signal generating circuit and the take-up reel frequency detection signal generating circuit generate signals of large amplitudes with an input current of not lower than 30 microamperes, so that they are each formed by an amplifier with a broader operating margin.

Hence, if these five sensor detection signal generating circuits are simply mounted on an integrated circuit, the large amplitude input signals to the supply reel frequency detection signal generating circuit or to the take-up reel frequency detection signal generating circuit may be occasionally input into the drum phase detection signal generating circuit or into the drum frequency detection signal generating circuit to give rise to inconveniences such as oscillations or the like which interfere with the smooth and stable operation of the integrated circuit in its entirety.

SUMMARY OF THE INVENTION

In view of the above described status of the prior art, it is a principal object of the present invention to provide an integrated circuit in which the above five sensor detection signal generating circuits may be mounted and operated with stability.

For accomplishing the above object, the present invention provides an integrated circuit for generating predetermined sensor detection signals in a recording-/reproducing apparatus adapted for recording and/or reproducing predetermined information data on a tape-shaped recording medium wound on a rotary head. The integrated circuit is comprised of a drum phase detection signal generating means formed by first and second amplifiers for amplifying drum phase signals obtained from a rotary head. A first comparator generates a drum phase detection signal from the amplifier drum phase signal. A drum frequency detection signal generating means is formed by third and fourth amplifiers for amplifying the drum frequency signal obtained from the rotary head. A second comparator generates the drum frequency detection signal from the amplified drum frequency signal. A capstan frequency detection signal generating means is formed by a third comparator for generating the capstan frequency detection signal from the capstan frequency signal obtained from the capstan adapted for driving the tape-shaped recording medium into a running condition. A supply reel frequency detection signal generating means is formed by a fourth comparator for generating the supply reel frequency detection signal from the supply reel frequency signal obtained from the supply reel for the tape-shaped recording medium. A take-up reel frequency detection signal generating means is formed by a fifth comparator for generating the take-up reel frequency detection signal from the take-up reel frequency signal obtained from the take-up reel for the tape-shaped recording medium. First, second, and third power source means are provided for supplying a predetermined voltage to the first and third amplifiers, the second and fourth amplifiers, and to the first to fifth comparators.

With the above described integrated circuit, there are provided drum phase detection signal generating means formed by two-stage amplifiers and a comparator. A drum frequency detection signal generating means is likewise formed by two-stage amplifiers and a comparator. A capstan frequency detection signal generating means, a supply reel frequency detection signal generating means, and a take-up reel frequency detection signal generating means are each formed by a comparator. A predetermined voltage is supplied to each of a group of the first stage amplifiers, a group of the second stage amplifiers, and a group of the comparators to prevent the large amplitude input signals to the capstan frequency detection signal generating means, supply reel frequency detection signal generating means, or the take-up reel frequency detection signal generating means from being inadvertently input into the drum phase detection signal generating means or into the drum frequency detection signal generating means by means of the voltage sources. In this manner, the drum phase detection signal generating means, drum frequency detection signal generating means, capstan frequency detection signal generating means, supply reel frequency detection signal generating means, and the take-up reel frequency detection signal generating means may be formed in one integrated circuit and operated with improved stability.

BRIEF DESCRIPTION OF THE DRAWING

The drawing FIGURE is a schematic electrical connection diagram showing a portion of a rotary head digital audio tape recorder employing an integrated circuit according to the present invention.

DESCRIPTION OF THE PREFERRED EMBODIMENTS

By referring to the accompanying drawing, an embodiment of the present invention will be explained in detail.

In the drawing FIGURE, a rotary head type digital audio tape recorder (R-DAT) 1 employing an integrated circuit 2 according to the present invention is shown. The digital audio tape recorder 1 is so constructed and arranged that a DAT cassette 3 is mounted in position in the R-DAT 1. A magnetic tape 5 is extracted from a supply reel 4 within the DAT cassette 3 and is wound through an angle of 180° on a drum 9 by means of two guide pins 6 and 7 so as to be then taken up on a take-up reel 12 within the DAT cassette 3 by means of a capstan 10 driving the magnetic tape into the running condition and a pinch roll 11. Rotary heads 8A, 8B formed by a pair of magnetic heads angularly spaced by about 180° from each other are placed on the drum 9.

With the above described R-DAT 1, a drum phase sensor is formed by a small magnet piece 13 secured to the outer periphery of the drum 9 and a magnetic head 14 provided at a predetermined position on the perimeter of the drum 9. As the small magnet piece 13 passes by the magnetic head 14 in response to rotation of the drum 9, a drum phase signal $S_{PGDR}$ which rises and falls in the form of a sinusoidal wave for each rotation of the drum 9 is obtained as the output signal of the drum phase sensor. This drum phase signal is input at an input terminal a of a drum phase detection signal generating section 2A of the integrated circuit 2.

A drum motor driving the drum 9 into rotation, a capstan motor driving the capstan 10 into rotation, and a reel motor for driving the supply reel 4 and the take-up reel 12 into rotation are provided with respective frequency sensors, each in the frequency generator configuration. A drum frequency signal $S_{FGDR}$, a capstan frequency signal $S_{FGCP}$, a supply reel frequency signal $S_{FGSP}$, and a take-up reel frequency signal $S_{FGTU}$, obtained as sensor output signals as a result of rotations of the associated components, are input at input terminals b, d, and of a drum frequency detection signal generating section 2B, a capstan frequency detection signal generating section 2C, a supply reel frequency detection signal generating section 2D, and a take-up reel frequency detection signal generating section 2E of the integrated circuit 2, respectively.

In practice, the drum phase detection signal generating section 2A is formed by two-stage amplifiers 20, 21, each in the operational amplifier configuration, and a comparator 22, and is so arranged and constructed that the input drum phase signal $S_{PGDR}$ is amplified to a predetermined level and compared with a predetermined threshold level. The resulting comparison signal is converted into a binary signal to produce a drum phase detection signal $PG_{DR}$ which rises and falls a predetermined number of times for each revolution of the drum 9. This drum phase detection signal is output at an output terminal f.

Similarly to the drum phase detection signal generating section 2A, the drum frequency detection signal generating section 2B is formed by two-stage amplifiers 23, 24, each in the operational amplifier configuration, and a comparator 25, and is so arranged and constructed that the input drum frequency signal $S_{FGDR}$ is amplified to a predetermined level and compared with a predetermined threshold level. The resulting comparison signal is converted into binary signals to produce a drum frequency detection signal $FG_{DR}$ which rises and falls at the repetitive frequency related to the rotation of the drum 9. This drum frequency detection signal $FG_{DR}$ is output at an output terminal g.

The capstan frequency detection signal generating section 2C is formed by a comparator 26 of an operational amplifier configuration and is so arranged and constructed that the input capstan frequency signal $S_{FGCP}$ is compared with a predetermined threshold level and converted into a binary signal to produce a capstan frequency detection signal $FG_{CP}$ which rises and falls at the repetitive frequency related to the rotation of the capstan 10. This capstan frequency detection signal $FG_{CP}$ is output at an output terminal h.

The supply reel frequency detection signal generator 2D and the take-up reel frequency detection signal generator 2E are also formed by comparators 27 and 28, each in the operational amplifier configuration, and is so arranged and constructed that the input supply reel frequency signal $S_{FGSP}$ and the input take-up reel frequency signal $S_{FGTU}$ are compared with predetermined threshold levels and converted into respective binary signals. The resulting supply reel frequency detection signal $FG_{SP}$ and take-up reel frequency detection signal $FG_{TU}$ rising and falling at the repetitive frequency related to rotation of the supply reel 4 and the take-up reel 12, respectively, are generated and output at output terminals i and j, respectively.

With the integrated circuit 2 of the present illustrative embodiment, a first voltage $V_{CC1}$ obtained from a first voltage source line on the integrated circuit pattern is input to an internal regulating section 29 to produce a stabilized voltage $V_{CC0}$ which is supplied to the first stage amplifier 20 of the drum phase detection signal generating section 2A and to the first stage amplifier 23 of the drum frequency detection signal generating section 2B. These amplifiers 20 and 23 are grounded to a first grounding line $GND_0$ on the integrated circuit pattern.

The first voltage $V_{CC1}$ is also supplied to the second stage amplifiers 21 and 24 of the drum phase detection signal generating sections 2A and the drum frequency detection signal generating sections 2B, respectively. These second stage amplifiers 21 and 24 are grounded at a second grounding line GND1 on the integrated circuit pattern.

A second voltage $V_{CC2}$ from a second voltage source line on the integrated circuit pattern is supplied to the comparators 22, 25, 26, 27 and 28 in the drum phase detection signal generating section 2A, drum frequency detection signal generating section 2B, capstan frequency detection signal generating section 2C, supply reel frequency detection signal generating section 2D, and the take-up reel frequency detection signal generating section 2E. The comparator circuit 22, 25, 26, 27 and 28 are also grounded at a third grounding line GND2 on the integrated circuit pattern.

In this manner, with the present integrated circuit 2, the comparators 22, 25, 26, 27, and 28 of the drum phase detection signal generating section 2A, drum frequency detection signal generating section 2B, capstan frequency detection signal generating section 2C, supply reel frequency detection signal generating section 2D, the take-up reel frequency detection signal generating section 2E, respectively, the first and second stage amplifiers 20, 23, 21, 24 of the drum phase detection signal generating section 2A, and the drum frequency detection signal generating section 2B are connected to the different voltage lines $V_{CC0}$, $V_{CC1}$ and $V_{CC2}$ and to the different grounding lines GND0, GND1 and GND2 on the integrated circuit pattern.

In this manner, the large amplitude input signal formed by the capstan frequency signal $S_{FGCP}$, supply reel frequency signal $S_{FGSP}$, and the take-up reel frequency signal $S_{FGTU}$ input to the capstan frequency detection signal generating section 2C, supply reel frequency detection signal generating section 2D, and the take-up reel frequency detection signal generating section 2E may be prevented from being mixed in with input signals to the drum phase detection signal generating section 2A or the drum frequency detection signal generating section 2B via voltage lines $V_{CC0}$, $V_{CC1}$ and $V_{CC2}$ and/or grounding lines GND0, GND1 and GND2.

Thus the drum phase detection signal generating section 2A, drum frequency detection signal generating section 2B, capstan frequency detection signal generating section 2C, supply reel frequency detection signal generating section 2D, and the take-up reel frequency detection signal generating section 2E formed on the single integrated circuit may be operated separately and with stability.

With the above described integrated circuit, the drum phase detection circuit 2A formed by the two-stage amplifiers 20, 21 and the comparator 22, the drum frequency detection signal generating section 2C formed by the two-stage amplifiers 23, 24 and the comparator 25, the capstan frequency detection signal generating section 2C, the supply reel frequency detection signal generating section 2D, and the take-up reel frequency detection signal generating section 2E formed by the comparators 26, 27, and 28, are formed in one integrated circuit. The predetermined voltages $V_{CC0}$, $V_{CC1}$, and $V_{CC2}$ are supplied to the first stage amplifiers 20, 23; to the second stage amplifiers 21, 24; and to the comparators 22, 25, 26, 27 and 28, respectively, to prevent the large amplitude input signals formed by the capstan frequency signal $S_{FGCP}$, the supply reel frequency signal $S_{FGSP}$, and the take-up reel frequency signal $S_{FGTU}$ from mixing in with input signals to the sections 2A or 2B via the voltage lines or the grounding lines. Thus the integrated circuit 1 of simplified construction may be realized in which the drum phase detection signal generating section 2A, drum frequency detection signal generating section 2B, capstan frequency detection signal generating section 2C, supply reel frequency detection signal generating section 2D, and the take-up reel frequency detection signal generating section 2E are provided on one circuit chip and are operated with stability.

Although the drum phase detection signal generating section and the drum frequency detection signal generating section are each formed by two stage amplifiers and a comparator in the above described illustrative embodiment, this is not limited to the present invention, and the effects similar to those of the above embodiment may be realized by proper allocation of the power source lines, even in cases wherein for example a waveforming circuit or a like circuit device is annexed between the two amplifier stages or between the second stage amplifier and the comparator.

In addition, although the capstan frequency detection signal generating section, supply reel frequency detection signal generating section, and the take-up reel frequency detection signal generating section are formed by respective comparators, the effects similar to those of the above embodiment may be realized by proper allocation of the voltages lines even in those cases wherein amplifiers or like circuit elements are annexed ahead and/or at back of the comparators.

Furthermore, although the foregoing description has been made of the case in which the present invention is applied to a rotary head type digital audio tape recorder, the present invention is not limited thereto, but may be extensively applied to an integrated circuit employed in a recording/reproducing apparatus adapted for recording and/or reproducing data on or from a recording medium in the form of a tape wound on a rotary head, such as a video tape recorder.

Although various minor changes and modifications might be proposed by those skilled in the art, it will be understood that I wish to include within the claims of the patent warranted hereon all such changes and modifications as reasonably come within my contribution to the art.

I claim as my invention:

1. An integrated circuit for generating predetermined sensor detection signals in a recording and/or reproducing apparatus adapted for recording and/or reproducing predetermined information data on or from a tape-shaped recording medium wound on a rotary head, comprising:

drum phase detection signal generating means including first and second amplifier circuit means for amplifying a drum phase signal obtained from said rotary head, and a first comparator means for generating a drum phase detection signal by comparing the amplified drum phase signal to a predetermined threshold;

drum frequency detection signal generating means including third and fourth amplifier means for amplifying a drum frequency signal produced by said rotary head, and a second comparator means for generating a drum frequency detection signal by comparing the amplified drum frequency signal to a predetermined threshold;

capstan frequency signal generating means including a third comparator means for generating a capstan frequency detection signal by comparing a capstan frequency signal produced by a capstan motor driving said tape-shaped recording medium in a running condition to a predetermined threshold;

supply reel frequency detection signal generating means including a fourth comparator means for generating a supply reel frequency detection signal by comparing a supply reel frequency signal obtained from a supply reel of said tape-shaped recording means to a predetermined threshold;

take-up reel frequency detection signal generating means including a fifth comparator means for generating a take-up reel frequency detection signal by comparing a take-up reel frequency signal obtained from a take-up reel of said tape-shaped recording medium to a predetermined threshold;

power source means for supply predetermined power sources to each of said first and third amplifier means, second and fourth amplifier means, and said first to fifth comparator means:

said power source means supply a first voltage to said first through fifth comparator means, a second voltage independent of and different than the first voltage to the second and fourth amplifier means, and a third voltage independent of and different than said first and second voltages to said first and third amplifier means;

said first and third amplifier means being connected to a first grounding line, the second and fourth amplifier means being connected to a second grounding line which is independent of the first grounding line, and the first through fifth comparator means being connected to a third grounding line which is independent of the first and second grounding lines; and the drum phase signal and the drum frequency signal produced by said rotary head having voltage levels which are in a microvolt range and are substantially smaller than voltage levels of said capstan frequency signal, supply frequency signal, and take-up reel frequency signal in a millivolt range.

2. A circuit according to claim 1 wherein said third voltage is created by an internal regulating section means for producing a stabilized voltage.

3. A circuit for generating predetermined sensor detection signals in a recording and/or reproducing apparatus adapted for recording and/or reproducing predetermined information data on or from a tape-shaped recording medium wound on a rotary head, comprising:

rotary head movement detection signal generating means including first and second amplifier circuit means for amplifying a rotary head movement signal obtained from said rotary head, and a first comparator means for generating a rotary head movement detection signal by comparing a tape movement frequency signal produced by a tape movement mechanism associated with movement of said tape-shaped recording medium in a running condition to a predetermined threshold;

said first and second amplifier circuit means, and first and second comparator means all being integrated on a same common integrated circuit chip;

a first independent power source means for supplying power to said first amplifier means, a second independent power source means for supplying power to said second amplifier means, and a third independent power source means for supplying power to said first and second comparator means:

said first independent power source means comprising an internal regulating section means for producing a stabilized voltage for said first amplifier means;

a voltage level of said rotary head movement signal lying in a microvolt range which is substantially smaller than a voltage level of said tape movement signal which lies in at least a millivolt range; and said first amplifier circuit means being connected to a first independent ground line, said second amplifier circuit means being connected to a second independent ground line, and said first and second comparator means being connected to a third independent ground line, the first, second, and third ground lines being independent of one another.

4. A circuit for generating predetermined sensor detection signals in a recording and/or reproducing apparatus adapted for recording and/or reproducing predetermined information data on or from a tape-shaped recording medium wound on a rotary head, comprising:

rotary head movement detection signal generating means including a first amplifier circuit means for amplifying a rotary head movement signal obtained from said rotary head, and a first comparator means for generating a rotary head movement detection signal by comparing the amplified rotary head movement signal to a predetermined threshold;

tape movement signal generating means including a second comparator means for generating a tape movement detection signal by comparing a tape movement frequency signal produced by a tape movement mechanism associated with movement of said tape-shaped recording medium in a running condition to a predetermined threshold;

said first and second amplifier circuit means, and first and second comparator means all being integrated on a same common integrated circuit chip;

a voltage level of said rotary head movement signal being substantially less than a voltage level of said tape movement signal;

a first independent power source means for supplying power to said first amplifier means, and a second independent power source means for supplying power to said first and second comparator means;

said first amplifier means being connected to a first independent ground line, and said first and second comparator means being connected to a second independent ground line independent from the first ground line;

the first independent power source means supplying a first voltage to the first amplifier means, the second independent power source means supplying a second voltage to the first and second comparator means, and wherein said first and second voltages are different; and said first independent power source means comprising an internal regulating section means for providing a stabilized voltage.

* * * * *